United States Patent
Feldmeier

[11] Patent Number: 5,868,050
[45] Date of Patent: Feb. 9, 1999

[54] PROCESS AND DEVICE FOR THE CONTINUOUS, CHIPLESS SEPARATION OF INDIVIDUAL RINGS FROM TUBULAR WORKPIECES

[75] Inventor: Fritz Feldmeier, Nürnberg, Germany

[73] Assignee: Mannesmann Aktiengesellschaft, Düsseldoft, Germany

[21] Appl. No.: 737,019

[22] PCT Filed: Apr. 27, 1995

[86] PCT No.: PCT/DE95/00578

§ 371 Date: Dec. 17, 1996

§ 102(e) Date: Dec. 17, 1996

[87] PCT Pub. No.: WO95/29777

PCT Pub. Date: Nov. 9, 1995

[30] Foreign Application Priority Data

Apr. 29, 1994 [DE] Germany .......................... 44 15 091.1

[51] Int. Cl.[6] .................................................. B21H 1/06
[52] U.S. Cl. ..................... 82/47; 82/83; 72/85; 72/128
[58] Field of Search ................................. 82/1.11, 47, 51, 82/53.1, 57, 58, 59, 70.2, 84, 85, 92; 83/15, 54, 170, 508.3, 425.3; 72/69, 70, 71

[56] References Cited

U.S. PATENT DOCUMENTS

| | | | |
|---|---|---|---|
| 3,470,775 | 10/1969 | Marcovitch | 82/83 |
| 3,847,002 | 11/1974 | Suzuki | 72/128 |
| 4,163,402 | 8/1979 | Bykhovsky | 82/1 C |
| 5,553,729 | 9/1996 | Kitano | 219/619 |
| 5,598,729 | 2/1997 | Hoffman | 72/8.5 |

FOREIGN PATENT DOCUMENTS

| | | |
|---|---|---|
| 1602950 | 1/1967 | Germany . |
| 667301 | 6/1979 | Russian Federation . |

*Primary Examiner*—Andrea L. Pitts
*Assistant Examiner*—Mark Williams
*Attorney, Agent, or Firm*—Cohen, Pontani, Lieberman & Pavane

[57] ABSTRACT

A process for the continuous chipless separation of identical individual rings from tubular workpieces by using cutting rollers. In order to produce highly-accurate rings, preferably from antifriction bearing steel, the section of the tubular workpiece to be separated is completely encompassed by the longitudinal contour of the cutting rollers and the faces of the rings are produced plane-parallel and vertical relative to the workpiece axis. What is essential is that prior to the cutting process the tubular workpiece is heated to a temperature that substantially lowers the deformation resistances of the material used.

14 Claims, 6 Drawing Sheets

PROCESS AND DEVICE FOR THE CONTINUOUS, CHIPLESS SEPARATION OF INDIVIDUAL RINGS FROM TUBULAR WORKPIECES

BACKGROUND OF THE INVENTION

1. Field of the Invention

The invention relates to a process for the continuous chipless separation of identical individual rings from tubular workpieces.

2. Description of the Prior Art

Ring-shaped components are widespread in technology. In roller bearing technology, such components constitute a substantial portion, in terms of quantity, of the parts used. As is generally known, each roller bearing consists of at least two ring-shaped components, namely, the inner ring and the outer ring. These rings are produced in great numbers, for example, from tubular semifinished products of antifriction bearing steel. The division of tubular material into rings of equal size is thus a standard production step during the production of roller bearings. It is also a very important step, given the growing competition in the roller bearing industry. As efforts are made to achieve greater productivity and lower manufacturing costs, this production step assumes great significance. Especially during chip-producing separation, greater material expensive contributes to high costs.

A generic process for the chipless separation of identical individual rings from tubular workpieces is disclosed in German reference DE-OS 1602950. In this process, three cutting rollers with thread-shaped cutting edges are arranged around the workpiece to be processed. All three cutting rollers are driven in the same direction and pressed against the workpiece surface. The tubular workpiece rotates in the direction opposite to that in which the cutting rollers rotate and is thereby moved forward axially. The respective rotational positions of the three cutting rollers are such that the cutting contact with the workpiece occurs on an exactly shared cutting plane. The diameter of the cutting rollers increases, starting from the beginning and going toward the end, forming a narrowing channel. This device is not suitable for producing highly-accurate roller bearing rings, because the face regions of the separated rings are very rounded. Furthermore, the cutting edges of the cutting rollers wear out rapidly, because antifriction bearing steel has especially high deformation resistance; no measures to reduce this deformation resistance are indicated.

Another process for dividing tubular material is known from German reference DE-PS 10 13 487. In this process, a working head revolves around the tube to be divided. The working head has die holders arranged peripherally on a cross-sectional plane as well as cutting rollers mounted detachably in these holders. The cutting, rollers have cutting edges with substantially radial flanks, which can be brought to rest on the face of the tube to be divided during the dividing process. This process permits only discontinuous separation of individual tube segments. The device is not suitable for continuously separating identical rings from tubular material in short cycles.

SUMMARY OF THE INVENTION

The object of the invention is to provide a process for the continuous chipless separation of identical individual rings from tubular workpieces, which preferably permits highly-accurate rings to be manufactured from antifriction bearing steel, so that subsequent metal-cutting processing is completely eliminated or else its cost is low and so that hot-rolled tubes can be used directly without upstream heat treatment. A further object is to provide long service life for the cutting tool even when antifriction bearing steel is being processed.

Pursuant to this object, and others which will become apparent hereafter, one aspect of the present invention resides in a process for continuously, chiplessly separating identical individual rings from a tubular workpiece, which process includes the steps of initially heating the tubular workpiece to a temperature that substantially lowers deformation resistance of the workpiece material so that a higher temperature is produced on an outer surface of the workpiece than on an inner surface of the workpiece, driving three cutting rollers having thread-like cutting edges in a common direction, completely surrounding a section of the tubular workpiece to be separated with a longitudinal contour of the cutting rollers, pressing the cutting edges onto a surface of the workpiece and rolling the rollers on the workpiece surface. The cutting rollers being positioned so that the cutting contact with the workpiece occurs on an exactly shared cutting plane without interruption of a contact line between the workpiece and the cutting rollers. Each of the cutting rollers has a diameter that increases from a first end to a second end of the rollers so that a narrowing channel is formed by the rollers and so that the workpiece is subjected to high normal forces including axial forces on end faces and radial forces on a mantel surface of the workpiece so as to produce end faces on the rings that are plane-parallel and perpendicular to the workpiece. The workpiece is turned in a direction opposite to the cutting rollers and is moved axially from the first end to the second end of the rollers.

In contrast to the known prior art, the tubular workpiece to be separated is heated prior to the cutting process to a temperature that substantially lowers the deformation resistance of the material used. Depending on the material, the heated temperature can assume values of approximately 800° C. and more. The precise temperature setting is based on the deformation and scaling behavior of the material used, the design data for the cutting device, and the material and desired service life of the cutting rollers.

A further feature of the process according to the invention is that the faces produced on the separated rings are plane-parallel and vertical relative to the workpiece axis. This is a great advantage in producing roller bearing rings, in particular. The more precise the planar surfaces produced during separation are, the lower are the required post-processing costs, e.g., for plane-parallel pregrinding or rough grinding.

The centering entry phase prior to the actual separating process has proved advantageous, because it permits tubular workpieces with a greater breadth of tolerances to be processed. For instance, it is possible to directly process hot-rolled tubes without first carrying out cold deformation for tolerance-related reason, e.g., by means of cold pilgering or cold drawing. The possibility of using hot-rolled tubes enhances the economic advantageousness of the process considerably.

In order to attain the most geometrically accurate contour possible in the separated rings, the penetrating movement of the cutting rollers into the material of the tubular workpiece always occurs in precisely radial fashion relative to the axis of the tubular workpiece. The deformation forces are pressure forces which always act exactly vertical relative to the material surface throughout the entire separation process. The rings to be separated, as they move farther toward the final form in the separation process, are completely encompassed, seen in longitudinal section, by the longitudinal contour of the cutting rollers, with no interruption of the contact line between the workpiece and the cutting rollers during the entire separation process. The ring sections are subjected to high normal forces; firstly, axial forces on the faces and secondly, radial forces on the mantle surface. These normal forces are pure pressure forces and produce only pressure stresses in the contact areas with the cutting rollers, since the material is also prevented from flowing away laterally by the lateral form limit formed by the cutting edge flanks. Because the rings are encompassed on three sides during separation, high and constant contour accuracy is obtained in the rings, thanks to the unambiguous action of forces.

A further feature relates to the temperature profile in the tubular workpiece to be divided. According to the invention, a higher temperature is produced on the outer surface of the workpiece than on the inner surface. The material therefore has higher strength in the colder edge layer. This intensifies the deformation resistance of the tubular workpiece against compression by the radial forces created by the cutting rollers and increases the pressure stress in the material. This effect is positive for the inventive process, because the aforementioned pressure stresses in the material are further increased and thus the shape and size accuracy are improved. A somewhat harder edge layer of the boring wall also reduces flash formation and thus favors the separation of the rings. An additional strike-off device, as mentioned in the prior art, is therefore not required in the process according to the invention. In most cases, the set temperature gradient also makes it possible to dispense with an internal support for the tubular workpiece to be cut, which substantially simplifies the design as a whole. For the most part, the tubular workpiece is heated inductively, because this makes it possible to regulate the penetration depth of the heat via the frequency. However, depending on the forward motion, the wall thickness and the material, it may be necessary to provide preheating, for example, by means of a muffle furnace.

The proposed heating of the tubular workpiece prior to the cutting process does lead, however, to heating of the working area, because the surface temperature of the workpiece is transferred to the cutting rollers and because the cutting process itself, which entails loss, increases the workpiece temperature. In order to keep the temperature of the cutting rollers below a preset value that does not diminish the strength properties and service life of the cutting roller material, it is therefore proposed to internally cool the cutting rollers. In addition, in order to reduce the frictional forces on the outer surface of the cutting rollers as well as on the workpiece to be separated, a combined cooling and lubricating agent is called for.

A further advantage in dividing a preheated tubular workpiece is that the hardness of the starting material has no influence. It is therefore possible to use, for example, a rolled tube directly from the cooling bed after rolling. The basic annealing otherwise required by antifriction bearing steel is thus performed for the first time on the individual separated rings, placing the rings in a state free of internal stress. Such rings experience less hardening distortion after their final processing in the soft state following hardening and reheating. More accurately shaped rings that require less grinding can therefore be supplied to the grinding that follows hardening. This improves the quality of the final product and reduces grinding times for the rings.

The process according to the invention can be used to separate identical rings from tubular workpieces. However, it can also be used to apply a profile to the rings at the same time. For example, the track for the inner ring of a roller bearing can be formed simultaneously during separation. Another example is forming a conical surface in the mantel region of the ring. For this purpose, the cutting rollers are provided between the cutting edges with a suitable negative form which, beginning at zero, increases continuously from thread to thread up to the final form.

In the known manner, the device according to the invention consists of three cutting rollers with thread-shaped cutting edges, which are driven in the same direction and arranged around the tubular workpiece to be processed. Seen in longitudinal section, the cutting edges are equipped with flanks running substantially radially, and their width increases continuously from entrance toward exit. This increase in cutting edge width is required in order to maintain a particular width/height ratio despite the increased radial extension of the cutting edges. Otherwise, there is a danger that the cutting edge will break away, because an excessively narrow cutting edge does not have an adequate cross-section to absorb the forces. The contour in the base between the cutting edges is preferably parallel to the axis of roll. As mentioned above, the diameter of each cutting roller increases steadily from the beginning toward the end, forming a narrowing channel.

The rotational movements of the individual cutting rollers must be synchronized with one another. The cutting rollers must be driven at least once at the same circumferential speed. This can be most easily carried out by connecting the shafts of all three cutting rollers to one another in a positive-locking fashion and moving these shafts by a single shared drive shaft. As explained above in reference to the process, an entry part that forms a funnel is provided on the entry side. This entry part may be an integral part of the cutting rollers themselves, e.g., in the form of a short slip bevel, or it may extend spherically over multiple threads. Alternately, a ring-shaped section with a slip bevel may also be arranged in front of the cutting roller. The advantage of having an entry part is that tolerance variations in the entering tubular workpieces can be better bridged; furthermore, rolled material as well as non-directional material can be processed immediately. Instead of the precision tubes otherwise commonly used, it is possible to use less expensive semifinished stock, without sacrificing quality in the final product. This provides a clear economic advantage.

The axial advance of the tubular workpiece is forced by rolling the radial flanks of the cutting rollers, which are pressed radially against the workpiece, on the workpiece. However, this kinematic force is not immediately available when the tubular workpiece is introduced into the cutting arrangement. For this reason, a detachable advancing device that acts upon the tubular workpiece is arranged in front of the rollers on the entry side. The forced advance, which simultaneously causes the tubular workpiece to rotate in the direction opposite to that in which the cutting rollers rotate, acts in the axial direction. In its movement, the forced advance is precisely adjusted to the speed of the cutting rollers and the inclination of the cutting edges and is effective for at least one cutting roller length. After the tubular workpiece is introduced, its proper axial transport through the device is thus maintained simply by the rotation of the cutting rollers and the axial pressure of the cutting flanks.

The geometry of the cutting thread consists of the negative form of the outer ring profile to be transferred to the ring being separated and the lateral limit with the flanks of the cutting edges for the cutting process. The ring profile is replicated on the base between the cutting edges and preferably oriented in axis-parallel fashion to the cutting axis roller. The cutting geometry consists of two segments. In the known manner, the cutting head has a pointed or blade-like shape at its largest diameter, so that it can easily penetrate the material to be cut. This head is kept short relative to the total cutting length. The cutting foot has nearly parallel radial flanks or flanks inclined in rooflike fashion only slightly plus$\leq 5°$ relative to the radial plane of the cutting roller. The flanks of the cutting foot laterally limit the contour of the cutting thread. Whether the flanks are almost radial or, on the other hand, are arranged extending out minimally from the base with an outward inclination, i.e., expanding the thread outward, depends on the diameter of the cutting rollers relative to the diameter of the tubular workpiece. At a ratio$\geq 3$, the cutting flanks must be inclined slightly outward. This ensures that the cutting edge can roll off freely, without wedging effect, in the cutting track.

For favorable distribution of the forces that arise, the aforementioned diameter ratio is preferably kept<3, so that the cutting foot has almost exactly radial flanks. Thus, for a tubular workpiece with a diameter of 40 mm, cutting rollers with a diameter of 100 mm are used. This ensures that, because of the relatively slanted striking of the cutting edges against the cutting track, very high axial forces, but no radial forces, are created in the contact area of the cutting rollers to the material to be separated. The tangential forces, which together with the axial forces constitute the shearing forces of the separation process, are very small and do not interfere with the process.

In order to heat the tubular workpiece, there is an induction coil, preferably on the entry side, through which the tubular workpiece is run. Depending on the frequency and the passage time, the heated areas of the material are closer to or farther from the surface. Using an appropriate frequency, which is adjusted to the thickness of the material to be separated and the output of the inductive heating arrangement, it is possible to attain a lower temperature toward the boring, so that the material in this colder edge layer has a higher strength.

The contour of the cutting rollers is adjusted to the required outer contour of the rings. The base of the contour is usually a straight line between the cutting edge threads, with a diameter constant over almost all threads. Alternatively, however, it may also be advantageous for the diameter of the contour base to increase slightly in the actual working area. This slight increase serves to intensify the radial pressure. In the exit area, the diameter of the contour base remains constant or even declines slightly. The point here is that the diameter of the separated ring corresponds to the inside diameter of the cutting roller arrangement in the exit area. Otherwise, in the event of excessive radial pressure, the ring would burst, so that the distribution of the diameter variations would be very large. For the same reason, it is also proposed to attached a calibration section after the last cutting thread on the cutting roller. This can be an integral part of the cutting roller or a separate ring-shaped section. This calibration section provides the advantage that, regardless of the separation process, the roundest possible ring is produced, with only slight variations in diameter. As mentioned above, an entry section is provided on the entry side. The entry section is designed either as a short slip bevel or as a section wherein the diameter of the contour base increases steadily toward the entry side. Advantageously, this entry part can process even materials with large variations in outer diameter without any problem.

In principle, the thread of the cutting rollers can be designed in a single-thread or a multi-thread fashion. The single-thread design is a preferred embodiment, because here the thread rise is minimized and the axial advance force acting between the cutting roller and the material can therefore be transferred most effectively.

When three cutting rollers are used, the radial position of the workpiece is unambiguously established, so that further guidance elements are not necessary. On the one hand, the diameter of the cutting rollers should have a particular ratio to the diameter of the workpiece to be divided; on the other hand, however, it should be as large as possible. The limits are based on the fact that it is not possible to simple use cutting rollers of any desired size, because such rollers would interfere with one another.

The process for producing rings according to the invention is especially suitable for rings with outer diameters of 16 to 80 mm and wall thicknesses equal to roughly 8 to 15% of the outer diameter. The favorable ratio of ring width to ring diameter is 0.2 to 0.5. This process is advantageously used to produce rings when material costs account for a large part of the ring costs, because no material losses are created by chip-producing metal cutting and because more accurate and economical rings are provided for the processing steps that follow. A preferred use is the chipless processing of antifriction bearing steel tube heated to approximately 800° C. into rings. In order to implement the process, higher temperatures are required on the surface of the workpiece, which are then transferred to the cutting rollers and heat the working area to a considerable extent. There are cooling channels in the cutting rollers, through which a medium with high heat absorption capacity is circulated, being pumped by means of a heat exchanger arranged outside of the separation device. The cutting rollers consist of an inner part with worked-in cooling channels and an outer sleeve into which the cutting profile is worked. The sleeve with the cutting profile is made of high-strength, non-temperature-sensitive material, e.g., sintered materials, or a suitable base material coated with a hard temperature-resistant material in the contact area with the material to be separated. The base part and the profiled sleeve are connected to the cutting roller tightly and in turn-proof fashion. The process according to the invention as well as the device are described in greater detail in reference to the drawings.

DETAILED DESCRIPTION OF THE PREFERRED EMBODIMENTS

Figure 1:
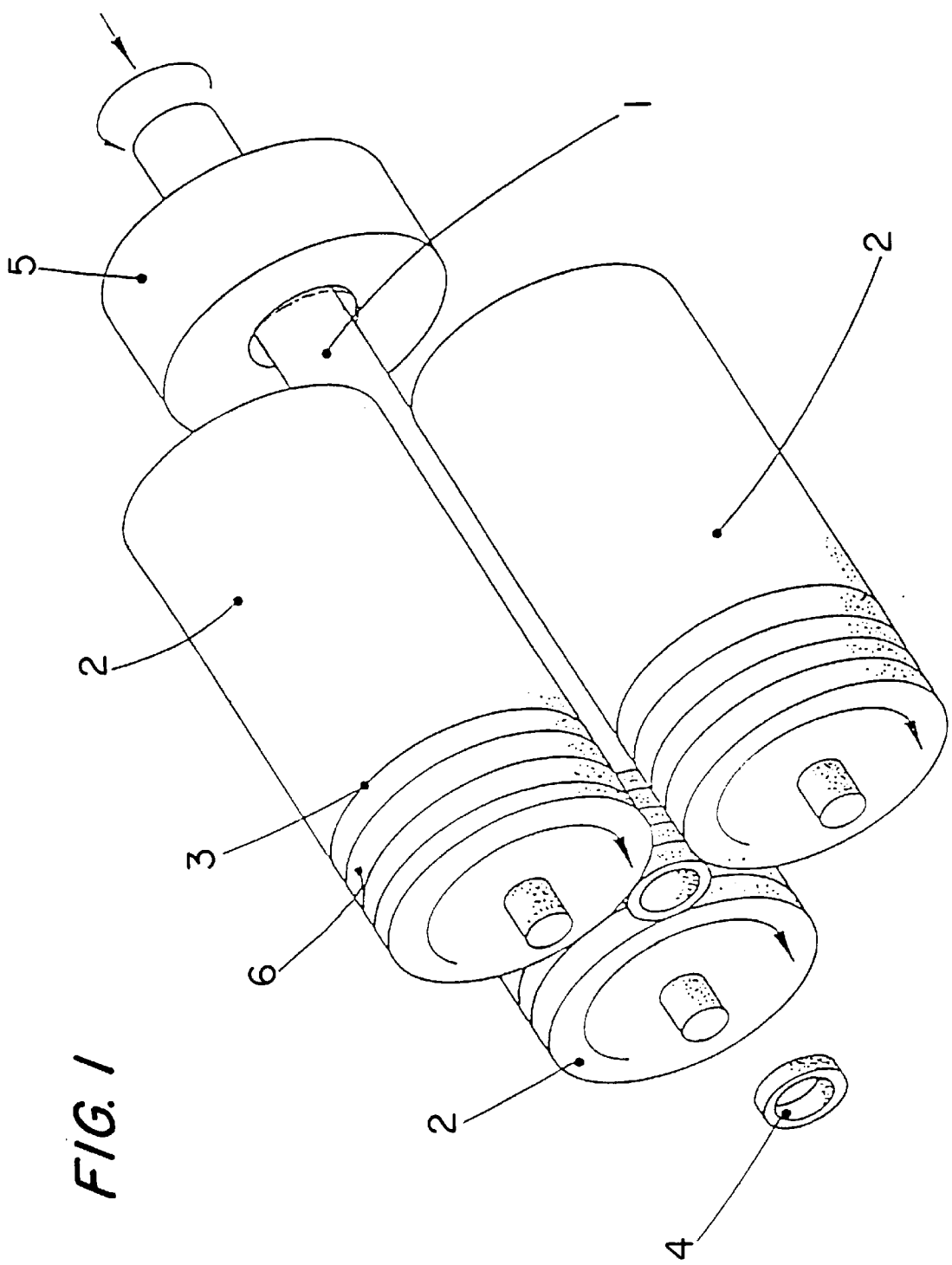
FIG. 1 is a perspective view of an entire arrangement of the essential components of the device according to the invention.

FIG. 1 shows the principle of the entire arrangement of the device according to the invention with its essential components. The tube 1 to be divided is subjected to an axial forward movement, heated in the induction coil 5 and introduced between the three cutting rollers 2. The three cutting rollers 2 are arranged axis parallel to one another and parallel to the advance direction of the tube 1. The distance of the cutting rollers 2 to the tube 1 is such that the cutting edges 3 of the rollers 2 penetrate radially into the wall of the tube 1. The three cutting rollers 2 are arranged in the form of an equilateral triangle around the tube 1 to be separated. The three cutting rollers 2 are subjected by a drive mechanism (not shown here) to a regular, synchronous rotational movement. This synchronous rotational movement is connected kinematically to the axial advance movement of the tube 1 in such a way that the cutting edges 3 attached to the cutting rollers 2 always penetrate into the tube 1 exactly on a common plane. The rotational movement of the three cutting rollers 2 in one direction as well as the rotational movement in the opposite direction and the advance movement of the tube 1 are indicated by arrows.

As mentioned above, the tube 1 to be separated also rotates around its own axis. This rotation is caused by the rolling movement of the cutting rollers 2 on the tube 1. As a result, all areas on the circumference of the tube 1 come into contact with the cutting rollers 2. The cutting edges 3 do not have a constant height. Rather, on the side from which the tube 1 is introduced, the cutting edges are initially quite flat, so as to scarcely penetrate into the tube 1 in this area. Toward the opposite end, the cutting edges 3 gain increasingly in height, so that they penetrate ever deeper into the wall of the tube 1. In the course of the movement forced in this way, the tube 1 is finally separated into discrete individual rings 4 at the other axial end of the cutting rollers 2.

Figure 2:
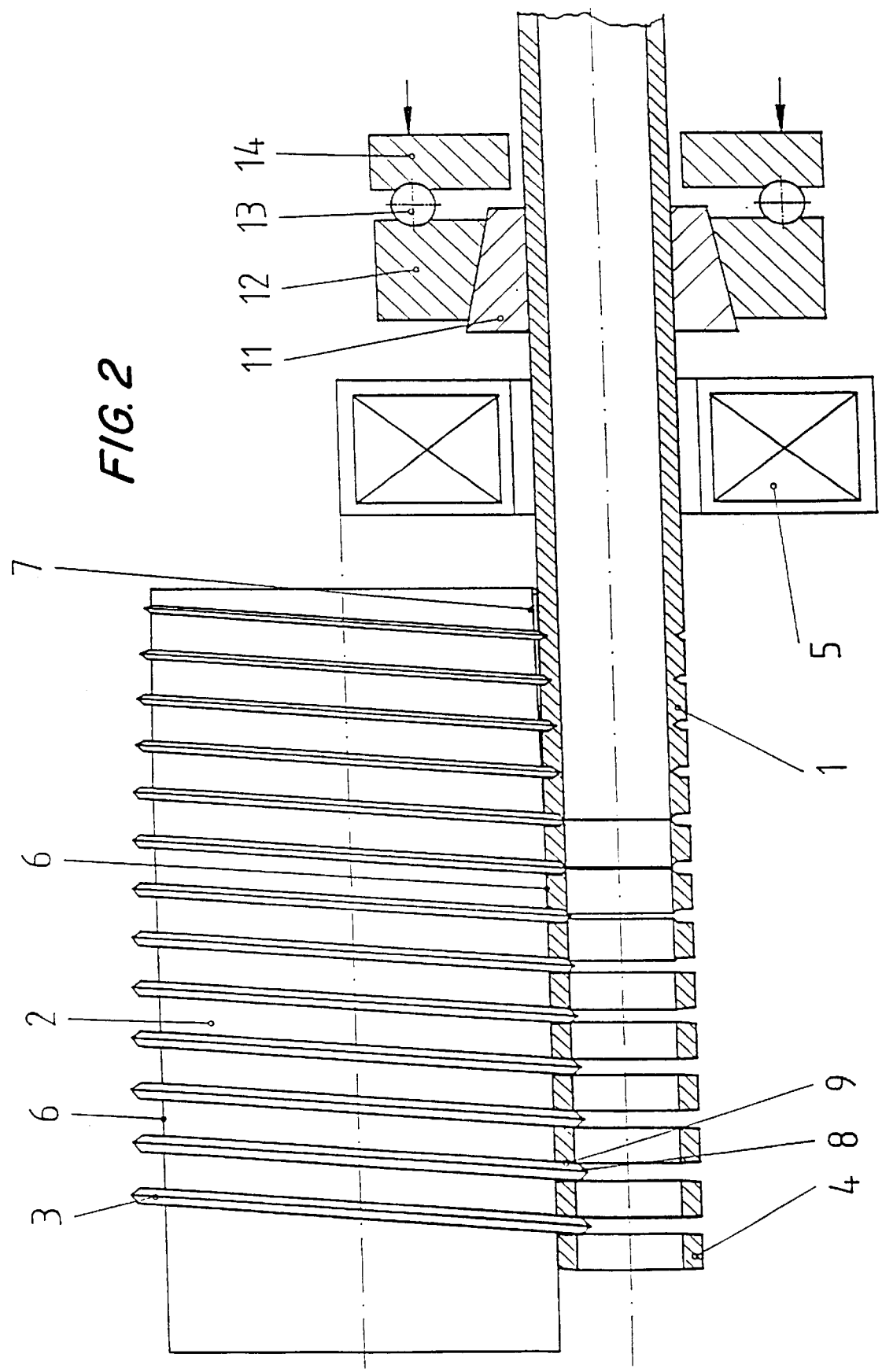
FIG. 2 shows a cutting roller with a thread-type cutting edge attached to it, whereby the diameter of the cylindrical outer contour of the cutting rollers, as well as the diameter of the cutting edge, increases steadily.

This last feature is explained in detail by FIG. 2 in particular. This drawing shows the interaction between the tube 1 and a single cutting roller 2. The other cutting rollers 2 (not shown here) are arranged around the tube 1 in the form of a triangle. At the end of the cutting roller 2 from which the tube 1 is introduced, the cutting edge 3 is formed only very slightly. At this end, what matters is to securely grasp the tube 1, to support the rotational movement of the tube 1, and to ensure its kinematically correct axial movement. The cutting edge 3 is designed so that its diameter as well as its width increase steadily toward the opposite end. In certain cases, it may also be advantageous for the diameter of the contour base 6 to increase slightly in the actual working area while remaining constant, or possibly even declining somewhat, in the exit area. This is to prevent the rings from springing up resiliently after leaving the cutting rollers 2. In order to securely grasp even tubes 1 with larger variations in outer diameter, the cutting roller 2 has an entry portion 7. In this section, the diameter of the contour base 6 is reduced more sharply, so that a funnel-type area is created. In the actual cutting segment of the cutting roller 2, the contour base 6 is located with no gap on the outer wall of the tube 1. The cutting edge 3 penetrates more and more deeply into the tube 1, which finally is separated into discrete rings 4, all of which are the same size. The cutting edge 3 is designed to penetrate into the material and also to leave the faces of the rings 4 as even as possible. For this reason, the cutting edge 3, as shown in FIG. 4, advantageously consists of two segments. The cutting head 8 is pointed, so that it penetrates into the material. The attached cutting foot 9, in contrast, is designed so that the flanks are largely vertical relative to the rotational axis of the cutting roller 2, so that the face formed on the separated rings 4 is largely planar. At the end where the tube 1 is introduced into the device, the cutting edge 3 consists exclusively of the pointed cutting head 8, which gradually becomes higher. In contrast, at the opposite end of the device, the cutting edge 3 consists predominately of the cutting foot 9.

Figure 3:
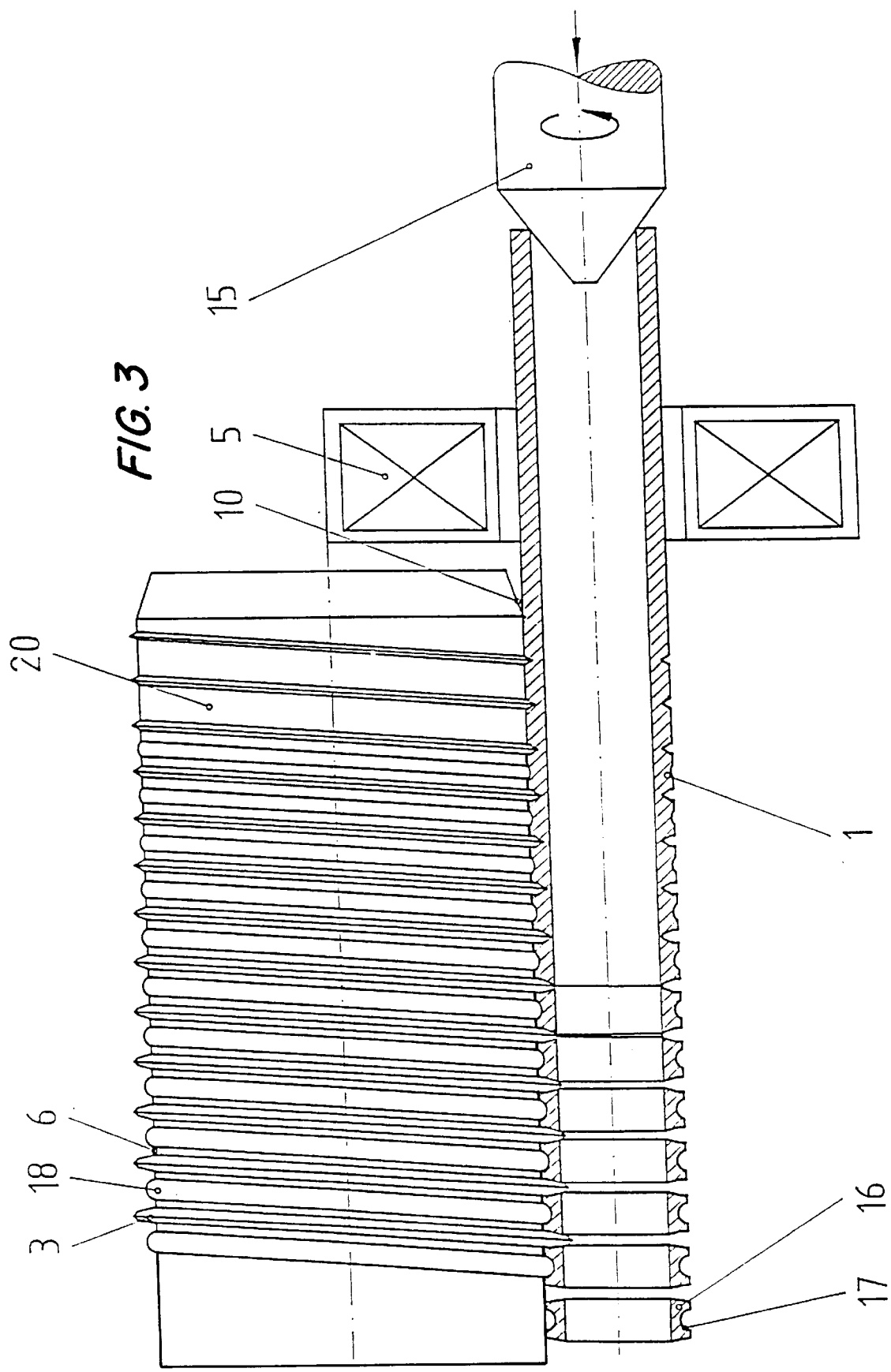
FIG. 3 shows a cutting roller with an outer contour with a constant diameter and an increasing cutting diameter.

In FIG. 2, the tube 1 to be separated is surrounded prior to its entry into the cutting device by a clamp-like holding device, which consists of an inner part 11 and an outer part 12. In the manner of a clamp set, the parts 11 and 12 can be pressed together by an axial activating force so that both are connected non-positively to the tube 1 to be separated. Because in this position, the parts 11 and 12 follow not only the axial movement of the tube 1, but also its rotational movement, the rotational movement must be disconnected by means of an axial bearing, which consists here of the roller element 13 and a second axial bearing ring 14. The kinematically correct axial advance speed is forced upon the axial bearing 14 by a suitable connection to the rotational movement of the cutting rollers 2. This auxiliary point is necessary, in any case, during the introduction of a new tube 1 into the device. In the case of an ongoing separation process, the inner part 11 and the outer part 12 of the clamp-like holding device are detached from one another by eliminating the activating force. The parts 11 and 12 move back into their starting positions and are not placed in motion again until a new tube is introduced. The holding device is shown in FIG. 2 with clamping parts and an axial roller bearing. In fact, other embodiments are also possible. In FIG. 3 this advance device is shown as a rotating centering tip 15, which centers itself in the tube bore and has take-along cutting edges of the known type.

In contrast to FIG. 2, the cutting roller 20 in FIG. 3 has a contour base 6 with a constant diameter over the length of the cutting rollers. The diameter of the cutting edge 3, however, increases from one end to the other in the known manner. For the purpose of introducing the tube 1 and for centering purposes, the cutting roller 20 has a slip bevel 10. To form a track 17 in the separated ring 16, for example, the contour base 6 has a suitable negative form 18. This negative form 18 increases continuously starting at zero on the entry side, until the desired final form is achieved. In contrast to the pure separation process, here the width of the contour base 6 increases steadily until the final form, because material displacement is caused by the negative form 18. Such cutting rollers 2, 20 with changeable thread-type cutting or cutting and profile curves can be produced on NC-controlled machines.

Figure 4A:
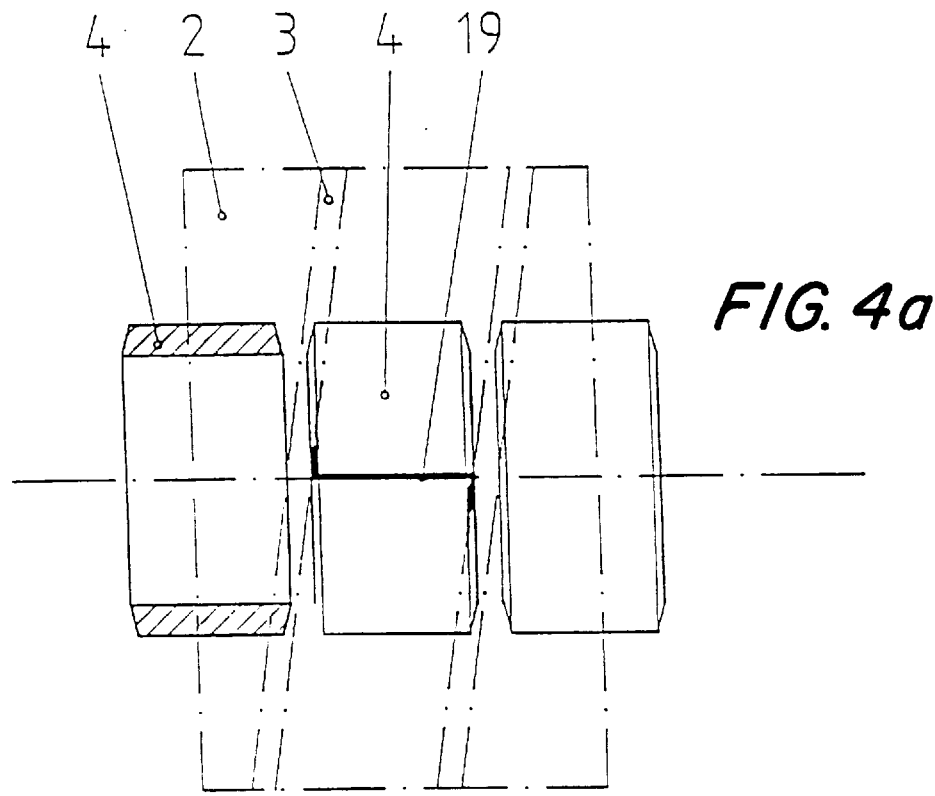
FIG. 4a is a top view of the cutting profile in conjunction with the tube to be separated.
Figure 4:
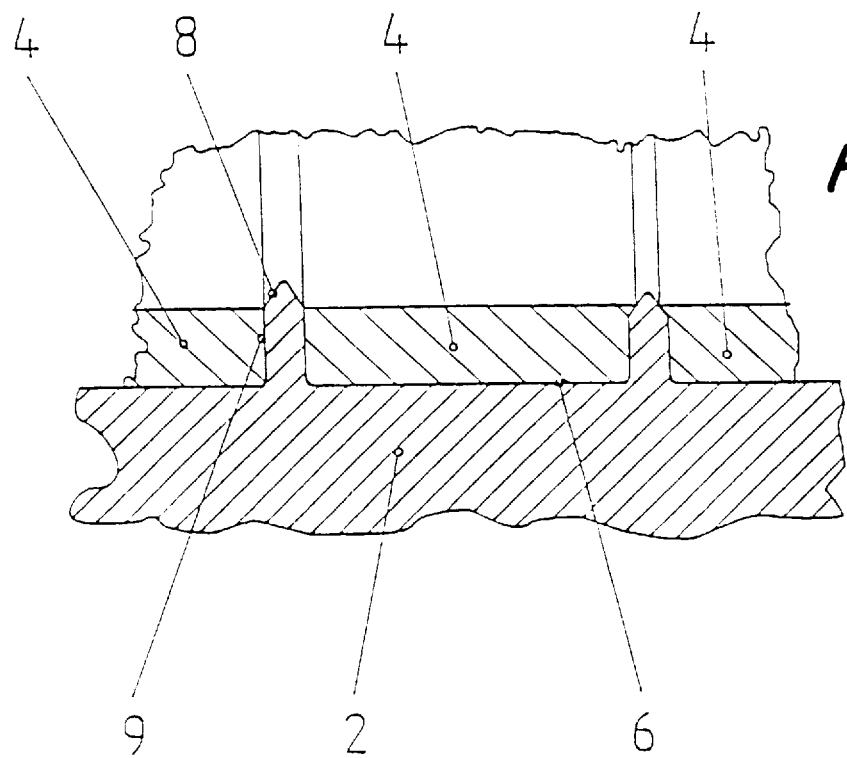
FIG. 4 is a cross-section of the cutting profile.

FIG. 4a shows a top view of the cutting profile in conjunction with the tube to be separated or the separated rings 4. This drawing illustrates the continuous contact of the ring section with the cutting roller 2. For the middle ring 4, this contact is indicated as the contact line 19.

Figure 5:
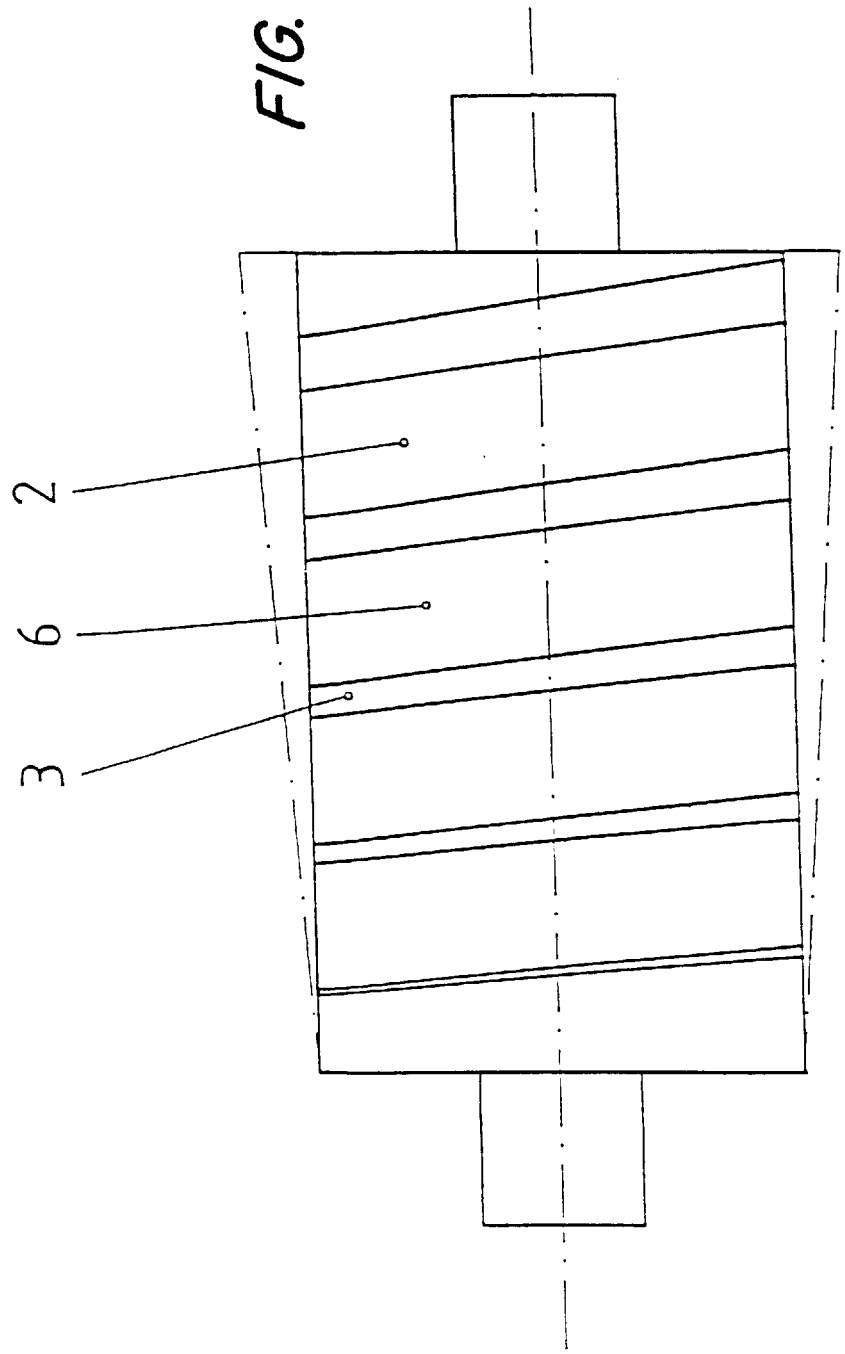
FIG. 5 shows a cutting roller with continuously increasing inclination of the cutting profile.

FIG. 5 essentially shows the cutting roller 2 with the steadily increasing thread rise of the cutting edge 3. In the case of pure separation with little material displacement, the width of the contour base 6 remains constant, and this width corresponds to the desired width of the ring to be separated. As mentioned above, for reasons of strength and stability, the width of the cutting edge 3 must also increase when the radial extension increases. To meet this requirement-constant width of the contour base-the thread rise must increase to the extent needed to compensate for the increasing width of the cutting edge 3. In the case of additional profiling of the ring, accompanied by greater material displacement, the width of the contour base 6 must increase continuously, except for the exit area, where the degree of material displacement approaches zero and the ring remains only to be calibrated. The dashed-dotted lines in FIG. 5 indicate that, regardless of the width selected for the contour base 6, the radial extension of the cutting edge 3 increases continuously from the entry toward the exit, so that in interaction with the two other cutting rollers 2 (not shown here) a narrowing channel is formed.

Figure 6:
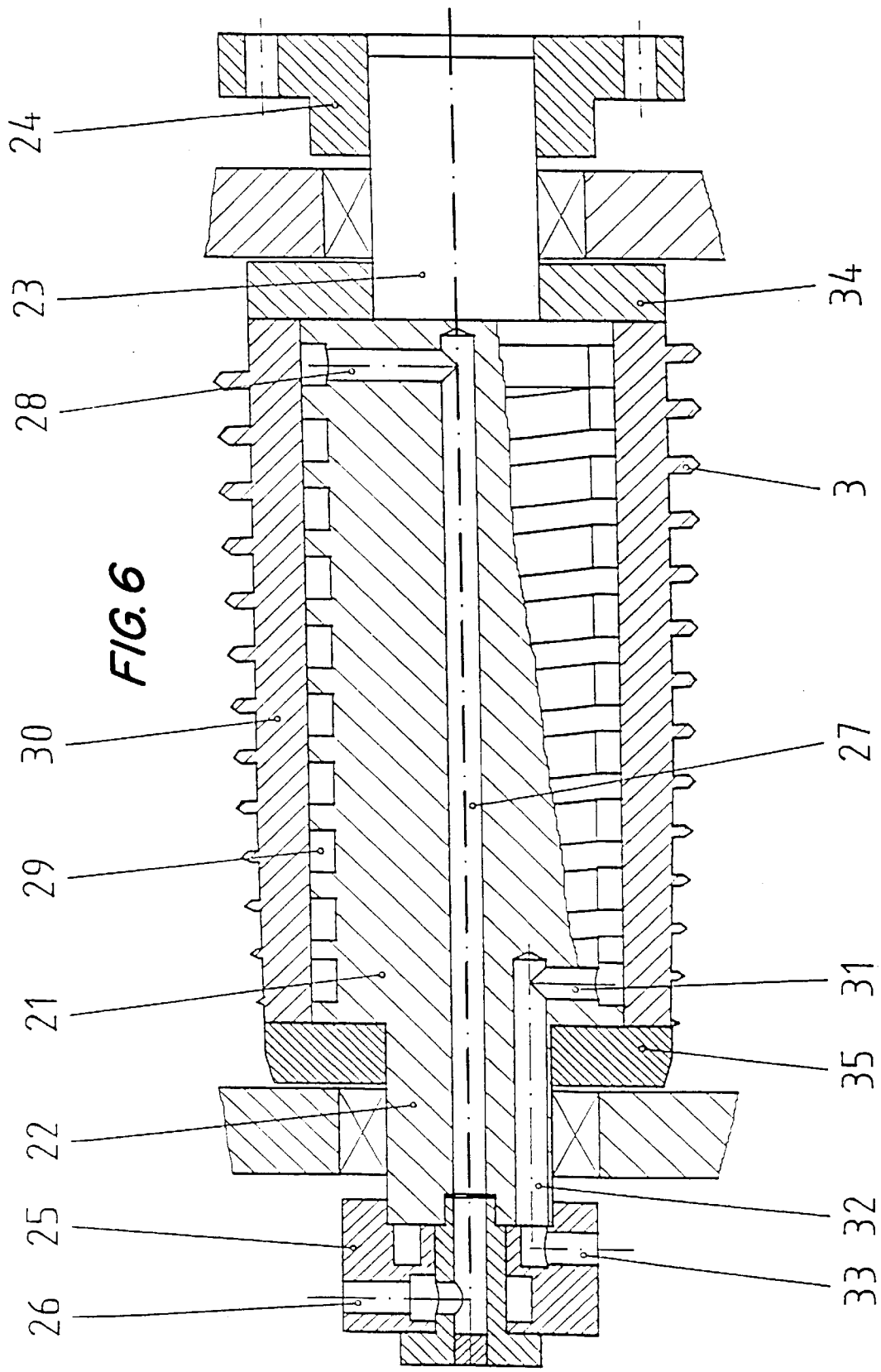
FIG. 6 is a longitudinal section through a cutting roller with internal cooling.

FIG. 6 shows a cutting roller that consists of an inner part of a shaft 21 and a cutting tool 30 with the cutting edges 3. At both ends, the shaft 21 has cylindrical, journal-like continuation pieces 22, 23, which accommodate on their outer diameters the bearings of the cutting rollers in the roller stands. To the ring exit side 23 is attached the coupling part 24, which establishes the rigid connection for the synchronous drive of the cutting rollers. On the entry side of the cutting roller, a rotatable coupling 25 is attached to the shaft journal 22. Via suitably arranged channels and borings, the coupling 25 implements the coolant circuit in the rotating cutting roller. The coolant inlet 26 is connected to a high-pressure pump (not shown here) that pumps the coolant through the center boring 27 in the shaft 21, through one or more radial borings 28 to the cooling channel 29 worked in spiral fashion into the outer diameter of the shaft 21. The coolant flows in the cooling channel 29 which is closed to the outside by the cutting tool 30, counter to the advance direction of the workpiece to one or more radial discharge borings 31. These discharge borings 31 are connected by means of one or more outlet borings 32 through the shaft journals 22 to the coolant discharge 33. From here, the heated coolant is fed through a heat exchanger back to the coolant pump. The cutting tool 30 is connected to the shaft 21 tightly and in turn-proof fashion by shrinking.

Attached to the cutting tool 30 in axial extension is a ring-shaped calibrating section 34, which again recalibrates the separated rings. The ring-shaped section 35 axially connected to the cutting tool 30 on the entry side has a slip bevel for easier centering of the new tubular workpiece introduced into the cutting device.

I claim:

1. A process for continuously, chiplessly separating identical individual rings from a tubular workpiece, comprising the steps of:

initially inductively heating the tubular workpiece to a temperature of at least 800° C. that substantially lowers deformation resistance of the workpiece material so that a higher temperature is produced on an outer surface of the workpiece than on an inner surface of the workpiece;

driving three cutting rollers having thread-like cutting edges in a common direction;

completely surrounding a section of the tubular piece to be separated with a longitudinal contour of the cutting rollers;

pressing the cutting edges onto a surface of the workpiece and rolling the rollers on the workpiece surface, the cutting rollers being positioned so that cutting contact with the workpiece occurs on an exactly shared cutting plane without interruption of a contact line between the workpiece and the cutting rollers, the cutting rollers each having a diameter that increases from a first end to a second end of the roller so that a narrowing channel is formed by the rollers and so that the workpiece is subjected to high normal forces including axial forces on end faces and radial forces on a mantel surface of the workpiece so as to produce end faces on the rings that are plane-parallel and perpendicular to the work axis; and turning the workpiece during heating in an opposite direction to the cutting rollers and moving the workpiece axially from the first end to the second end of the rollers.

2. A process as defined in claim 1, including subjecting the workpiece to an advancing force in a common direction with the cutting rollers in a manner supporting introduction of the tubular workpiece into the cutting rollers, the advancing force being kinematically connected to the rotational movement of the cutting rollers and being effective for at least one cutting roller length.

3. A process as defined in claim 1, including simultaneously profiling the rings during separation.

4. A process as defined in claim 3, and further comprising the steps of internally cooling the cutting rollers during separation and profiling, and externally subjecting the cutting rollers and the workpiece to a cooling and lubricating liquid.

5. A device for continuously, chiplessly separating identical individual rings from a tubular workpiece, comprising:

three cutting rollers with thread-like cutting edges drivable in a common direction and arranged around a tubular workpiece to be processed, each of the cutting rollers being equipped, as seen in longitudinal section, with flanks that run substantially radially and have a width that increases continuously from an entry end of the roller to an exit end of the roller, and having a contour base between the cutting edges of the cutting roller that is substantially parallel to the roller axis, each cutting roller being configured to have a continuous increase in diameter from the entry end to the exit end, all three cutting rollers being arranged around the workpiece so that the roller axes form an equilateral triangle, the rollers being connected to one another in a positive locking fashion, the cutting edges having a pointed cutting head and a cutting foot with flanks oriented substantially perpendicular to the roller axis, each roller having a funnel-shaped entry part on the entry end, the contour base being configured between the cutting edges to rest on a mantel surface and be substantially equidistant to the workpiece axis; and temperature regulated heating means arranged ahead of the cutting rollers on the entry end for heating the workpiece.

6. A device as defined in claim 5, wherein the flanks of the cutting foot are inclined substantially vertically relative to a particular roller axis when a ratio of the diameter of the cutting roller to the tubular workpiece is<3.

7. A device as defined in claim 5, wherein the flanks of the cutting foot are inclined away from a radial plane of the cutting rollers up to 50 when a ratio of the diameter of the cutting roller to the tubular workpiece is≧3.

8. A device as defined in claim 5, wherein each of the cutting rollers has an entry portion.

9. A device as defined in claim 5, and further comprising a ring shaped member with a slip bevel connected in front of each of the cutting rollers.

10. A device as defined in claim 5, and further comprising a calibrating section connected at the exit end of each of the cutting rollers.

11. A device as defined in claim 5, and further comprising means detachably arranged in the entry area of the cutting rollers for advancing the tubular workpiece, the advancing means being kinematically connected to rotational movement of the cutting rollers.

12. A device as defined in claim 5, wherein each of the cutting rollers includes a core part with worked-in cooling channels and a sleeve arranged on the core part, the cutting edges being formed in an outer surface of the sleeve, the core part and the sleeve being connected together tightly and in a turn-proof manner.

13. A device as defined in claim 12, wherein the sleeve is made of a heat-resistant hard metal.

14. A device as defined in claim 5, wherein the base of the cutting roller has a negative form between the cutting edges, the negative form being configured to increase continuously from thread to thread until a desired final form is reached, whereby the rings are profiled by the negative form of the base.

* * * * *